United States Patent [19]

Kinugawa et al.

[11] 4,252,414
[45] Feb. 24, 1981

[54] LIQUID CRYSTAL DISPLAY ELEMENT

[75] Inventors: Kiyoshige Kinugawa; Tadashi Ishibashi; Yoshimichi Shibuya; Yasuhiko Kando; Masatoshi Ito, all of Mobara; Ren Ito; Satoru Ogihara, both of Hitachi, all of Japan

[73] Assignee: Hitachi, Ltd., Japan

[21] Appl. No.: 1,161

[22] Filed: Jan. 5, 1979

[30] Foreign Application Priority Data

Jan. 11, 1978 [JP] Japan ................................. 53-1180

[51] Int. Cl.³ .............................................. G02F 1/133
[52] U.S. Cl. ................................. 350/339 R; 350/341
[58] Field of Search ................ 350/339 R, 341, 334

[56] References Cited
U.S. PATENT DOCUMENTS 4,068,923  1/1978  Toida ...................... 350/339 X Primary Examiner—Edward S. Bauer
Attorney, Agent, or Firm—Craig & Antonelli

[57] ABSTRACT

In a liquid crystal display element having a twisted structure wherein the periphery of two transparent glass substrates having electrodes according to desired display patterns is sealed with a sealing medium and a liquid crystal is enclosed in the space thus produced, the one characterized by having an undercoating film of metal oxide on the inner surface of each glass substrate, having a transparent electrode on each undercoating film of metal oxide and having an orientation controlling film made from an organic polymer and having abrasion grooves along a certain direction on each electrode can give a liquid crystal display element excellent in heat resistance of the orientation controlling film, excellent in adhesion to the glass substrates, and the like without causing a voltage drop, or without damaging rising of voltage-brightness property and response property.

10 Claims, 2 Drawing Figures

LIQUID CRYSTAL DISPLAY ELEMENT

This invention relates to a field-effect type liquid crystal display element.

Various proposals have been made concerning liquid crystal display elements, for example in Japanese Patent Appln. Kokai (Laid-Open) Nos. 7751/77, 7750/77 and 102051/77, and the proposals relating to the electrode substrates used in such elements have been also made in, for example, Japanese Patent Appln. Kokai (Laid-Open) Nos. 7749/77 and 65960/76.

Figure 1:
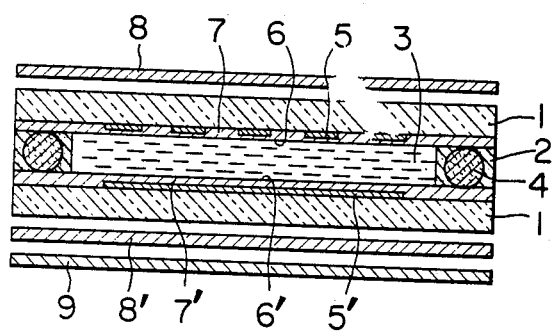
Figure 2:
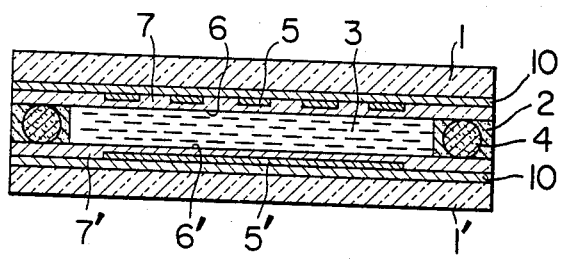

These prior art techniques and the improvements and advantages according to this invention are described in detail hereinbelow referring to the accompanying drawings in which FIG. 1 is a sectional view of a conventional twisted nematic type liquid crystal display element, and FIG. 2 is a sectional view showing the principal parts of a liquid crystal display element according to this invention.

First, a typical example of the twisted nematic type (TN type) liquid crystal display elements which are among the so-called electric field-effect type liquid crystal display elements is explained with reference to FIG. 1. The liquid crystal display element shown in FIG. 1 comprises a first substrate 1 and a second substrate 1' both of which are made of transparent glass or the like and arranged substantially parallel to each other with a predetermined spacing, for example 5 to 15 $\mu$m, therebetween, and the surrounding of these substrates is sealed with a sealant 2 such as for example frit glass or an organic adhesive, and a nematic-phase liquid crystal 3 is hermetically placed in the internal space formed by said substrates and sealant. Said spacing is provided by a suitable spacer 4 such as fiber glass, powdered glass, etc., but in case the sealant 2 is specifically designed to concurrently serve as spacer, no specific spacer is needed.

On the internal opposed sides of said both first and second substrates 1 and 1' are provided the electrodes 5 and 5' of a predetermined pattern, and the surfaces contacted with the liquid crystal are coated with liquid crystal orientation controlling films 7, 7' having liquid crystal controlling planes 6, 6' for orientating the liquid crystal molecules in the neighborhood thereof in a given direction. Such orientation controlling planes 6, 6' can be made by first forming the orientation controlling coating films 7, 7' of, for example, an organic polymer on each substrate surface provided with the electrodes and then subjecting the surface of said coating film to a rubbing treatment such as rubbing with cotton, cloth, etc., in a given direction.

In effecting such liquid crystal orientation, a first given direction is selected for the liquid crystal orientation controlling plane 6 of the first substrate 1 and a second given direction is selected for the crystal orientation controlling plane 6' of the second substrate 1', and said both directions are differentiated from each other so that the molecules of the nematic-phase liquid crystal 3 held between said both substrates 1 and 1' will be orientated with a twist from the first direction toward the second direction. The angle made by said first and second directions, that is, the twist angle of the liquid crystal molecules may be suitably selected, but usually it is approximately 90°.

Disposed on the outside of said both substrates 1 and 1' are a first polarizing plate 8 and a second polarizing plate 8', respectively. These two polarizing plates 8 and 8' are usually so arranged that the angle made by the axes of polarization thereof will be equal to the twist angle of the liquid crystal molecules (that is, the angle made by said first and second directions) or will be zero (in this case, the respective axes of polarization are parallel to each other), and that usually the orientating direction of each liquid crystal orientating plane will be parallel or vertical to the axis of polarization of the associated polarizing plate. Such a display element is widely utilized as a reflection type display element in which a reflector 9 is disposed on the back side of the second polarizing plate 8' for giving a normal display when the element was seen from the first substrate side; or as a night display element in which a photoconductor such as an acrylic resin plate, glass plate, etc., of a desired thickness is interposed between the second polarizing plate and the reflector 9 and also a light source (not shown) is disposed at a suitable location on one side of said photoconductor.

Here, the operating principle of a reflection type liquid crystal display element is explained by taking the case where the twist angle of the liquid crystal molecules is 90° and the axes of polarization of the two polarizing plates cross at 90°. In case no electric field is present in the liquid crystal layer, an extraneous light (the light entering the first polarizing plate 8 of the display element) becomes a rectilinear polarized light along the axis of polarization upon passage of said first polarizing plate 8 and then enters the liquid crystal layer 3, but since the liquid crystal molecules are twisted 90° in the layer, the polarizing plane of said polarized light is optically turned 90° upon passage of the liquid crystal layer and then transmits the second polarizing plate 8'. This light is then reflected on the reflector 9 and the reflected light passes the second polarizing table 8', the liquid crystal layer 3 and the first polarizing plate 8 in that order, that is, contrariwise to the above-said path, and is finally emitted out of the display element. Therefore, a viewer can see the polarized light which comes out of the liquid crystal display element after passing said element and reflected by the reflector 9.

In such a display element, when a predetermined voltage is applied to certain selected electrodes 5, 5' to give an electric field to a predetermined area in the liquid crystal layer, the crystal molecules in said area are orientated in the direction of the electric field. As a result, the polarizing plane in said area loses the optical rotatory power and makes no optical rotation, so that the light polarized by the first polarizing plate 8 is intercepted by the second polarizing plate 8' and hence the said area looks dark to the viewer.

In the case of a liquid crystal display element in which the axes of polarization of the two polarizing plates 8, 8' are parallel to each other, the area in the liquid crystal layer where no electric field is present looks dark while the area applied with an electric field looks bright.

It is therefore possible to make a desired display by applying an electric voltage to the certain selected electrodes.

As described above, in a liquid crystal display element of a twisted structure, it is necessary that the molecules of the liquid crystal sealed between the two glass substrates are orientated substantially parallel to the glass substrate surface and that the molecules in the liquid crystal layer are twisted by a predetermined angle, usually about 90°. Such liquid crystal orientation characteristic is provided by the orientation controlling films 7, 7' having the orientation controlling planes 6, 6' on the sides of the glass substrates opposed to the liquid crystal. Said orientation controlling films 7, 7' are usually made of an organic polymer. Although various kinds of organic polymer usable for said purpose are available, those containing at least one of imide ring and quinazoline ring are most preferred because they have a high orientation controlling capacity and are capable of forming an orientation controlling film which is not affected in its performance even when subjected to a high-temperature treatment.

On the other hand, frit glass or an organic adhesive is usually employed as sealant 2. In case of using frit glass as sealant 2, a heat treatment at a temperature of approximately 400° C. is required for fusing frit glass even when the frit glass used is of a low-melting type. Therefore, in case the orientation controlling films 7, 7' are made of a heat-resistant organic polymer containing at least one of said imide ring or quinazoline ring, even if the films made of such an organic polymer have heat resistance over 400° C., the portions contacted with the glass substrates 1, 1' would be deteriorated to cause damage to the abrasion grooves orientated in a given direction by said 400° C. heat treatment or the polymer film itself would be volatilized away, resulting in loss or deterioration of the properties of the orientation controlling films 7, 7' for orientating the liquid crystal.

It is known (for example, from a thermobalance analysis or infrared analysis) that in case a polyimideisoindoloquinazoline-dione film (hereinafter referred to as PIQ film) is used as the organic polymer film, PIQ itself has resistance to heat of up to about 450° C. However, when the transparent electrodes 5, 5' were formed on the respective soda glass substrates 1, 1' and then the orientation controlling films 7, 7' were provided thereon by first forming a PIQ film of approximately 1,000 Å and then rubbing it with a cloth or the like to form abrasion grooves as shown in FIG. 1, the film lost its liquid crystal molecular orientating capacity when subjected to a heat treatment at about 350° C. The portions which suffer such thermal deterioration are the areas where the glass substrates 1, 1' and the orientation controlling films 7, 7' are directly contacted with each other.

On the other hand, in case of using an organic polymer as sealant 2, heat resistance thereof poses no serious problem since the heat treatment temperature is relatively low. However, as the organic polymer sealant is permeable to water, the problem arises in its moisture resistance when it is used in the liquid crystal display element. If such polymer is used for the orientation controlling films, the water which soaked in from the outside through the sealant 2 might get in between the orientation controlling films 7, 7' and glass substrates 1, 1' because of poor adhesion between the films and the substrates in a moistened condition to reduce the lateral resistance of the glass substrates 1, 1'. Therefore, when an electric voltage is applied to the liquid crystal display element to have the electrode portions lighted, the areas therearound which must not be lighted actually are also lighted (such as defective phenomenon being hereinafter referred to as exudation).

For instance, as shown in FIG. 1, a display element was made by forming the transparent electrodes 5, 5' on the soda glass substrates 1, 1', then forming thereon the orientation controlling films 7, 7' by first forming a PIQ film of approximately 1,000 Å and then rubbing it with a cloth or the like to create abrasion grooves, then sealing them with an epoxy adhesive and encapsulating therein a liquid crystal 3 made by adding an ester type liquid crystal with a positive dielectric anisotropy to the base azoxy liquid crystal, and the thus obtained element was subjected to a moistening test under the conditions of 70° C. and relative humidity of 95%. As a result, exudation started in about 50 hours. This signifies 6-month to one-year life under the normal circumferential conditions. Such a short life provides a problem in practical use.

This invention is an attainment as a result of further studies for eliminating the said conventional defects, and it provides a liquid crystal display element which is improved in heat resistance of the orientation controlling films and adhesion thereof to the glass substrates.

The liquid crystal display element according to this invention is of a twisted structure and comprises two transparent substrates made of, e.g. glass, provided with transparent electrodes arranged according to desired display patterns, said two transparent substrates being sealed therearound by a sealant with a liquid crystal being sealed between said two substrates, characterized by having each one under coating film of one or more metal oxides on the inner surface of each substrate, and by having the transparent electrodes and one orientation controlling film made of an organic polymer with abrasion grooves on the inner surface of each said undercoating film.

An embodiment of this invention is now described in detail with reference to FIG. 2. In FIG. 2, the same parts as those in FIG. 1 are assigned the corresponding reference numerals; and in the following description, explanation on the same parts is not repeated to avoid redundancy. Also, the polarizing plates and the reflector are not shown in FIG. 2. This elimination was made merely for the purpose of simplification of explanation, and these members are of course used in the actual practice of the display element of this invention as discussed with relation to FIG. 1.

The display element according to this invention is characterized in that, as shown in FIG. 2, under coating films 10, 10' made of a metal oxide are formed between each glass substrate 1, 1'; and the associated transparent electrodes 5, 5', and orientation controlling films 7, 7' made of an organic polymer are formed on said undercoating films and said electrodes. Formation of such undercoating films 10, 10' can improve heat resistance of the orientation controlling films 7, 7' and adhesion thereof to the glass substrates 1, 1'.

Each said undercoating film 10 or 10' is made of a metal oxide such as silicon oxide, aluminum oxide, titanium oxide, etc. These materials may be used either singularity or in admixture. Such metal oxide undercoating films 10, 10' may be formed in various ways. For instance, it may be formed by directly coating each glass substrate with a metal oxide by vacuum evaporation or sputtering; or by a method in which a hydroxide, halide, etc., of a metal is coated on each glass substrate by spray coating, dip coating, spin on coating or other means and then heated; or a so-called chemical vapor deposition method in which a hydroxide, halide, etc., of a metal is thermally decomposed to obtain a metal oxide film. The thickness of each undercoating film is usually in the range of 10 Å to 100 μm.

The organic polymer used for forming the orientation controlling films 7, 7' is preferably a polymer containing at least one of the imide ring or quinazoline ring because such a polymer has a high orientation controlling capacity and is not affected in its performance even if subjected to a high-temperature treatment. Examples of the polymers containing the imide ring are polyimides involving imide bonds, polyamidimides involving both amide bonds and imide bonds, and polyesterimides involving both ester bonds and imide bonds. Polyimide-isoindoloquinazolinedione is a typical example of the polymers containing the quinazoline ring. These polymers can be obtained according to known methods, for example by reacting a diamine such as m-phenylenediamine, p-phenylenediamine, 4,4-diaminodiphenyl ether, 4,4'-diaminodiphenylether-3-carbonamide, etc., with at least one dicarboxylic acid anhydride, such as pyromellitic acid anhydride, 3,3',4,4'-benzophenonetetracarboxylic acid anhydride, etc. The thickness of the orientation controlling films 7, 7' is preferably 100 to 5,000 Å.

The sealant 2 used in this invention may be frit glass obtained by, for example, mixing 1.5 parts by weight of $SiO_2$ and 2.0 parts by weight of $Al_2O_3$ with 100 weight parts of a base composition comprising 28% by mole of $B_2O_3$, 61% by mole of PbO, 5% by mole of ZnO, 5% by mole of CuO and 1% by mole of $Bi_2O_3$. It is also possible to use an organic adhesive, for example, a mixed adhesive of 100 parts by weight of epoxy resin (Epikote 828) 20 parts by weight of polyamide resin (Epi-cure Z) and 20 parts by weight of pulverized $SiO_2$.

Described in the following are the results of the experiment conducted by using several metal oxides for forming the under coating films 10, 10'.

EXAMPLE 1

A soda glass substrate was immersed in a solution prepared by diluting silicon hydroxide in an alcohol-based solvent, then taken out and heated at 500° C. to form a silicon oxide film with thickness of about 1,500 Å. Thereafter, a transparent electrode was formed on the thus treated substrate and then a PIQ orientation controlling film with thickness of about 1,000 Å was further formed thereon.

EXAMPLE 2

A soda glass substrate was heated to about 300° C. and then subjected to electron beam evaporation by using silicon dioxide as evaporation source under a pressure below $1 \times 10^{-5}$ Torr to form a silicon oxide film with thickness of approximately 1,500 Å. Then a transparent electrode was formed on the thus treated substrate, followed by the formation of a PIQ orientation controlling film with thickness of about 1,000 Å further thereon.

EXAMPLE 3

A soda glass substrate as immersed in a solution prepared by diluting silicon hydroxide and aluminum hydroxide in an alcohol-based solvent such that the solids concentration ratio became 5:1, and then the substrate was taken out and heated at 500° C. to form a film made from the mixture of silicon oxide and aluminum oxide with thickness of about 1,000 Å, followed by the formation of a transparent electrode and a PIQ orientation controlling film with thickness of about 1,000 Å thereon.

EXAMPLE 4

A soda glass substrate was immersed in a solution prepared by diluting titanium chloride in an alcohol-based solvent, then taken out and heated at 500° C. to form a titanium oxide film with thickness of about 800° Å. Then a transparent electrode was formed on the thus treated substrate, followed by the formation of a PIQ orientation controlling film with thickness of about 1,000 Å further thereon.

EXAMPLE 5

A soda glass substrate was immersed in a solution prepared by diluting silicon hydroxide in an alcohol-based solvent, then taken out and heated at 500° C. to form a silicon oxide film with thickness of about 1,000 Å, followed by the formation of a transparent electrode and a PIQ orientation controlling film with thickness of about 1,500 Å thereon.

Any of the PIQ orientation controlling films formed according to the above-mentioned Examples 1 to 5 showed good heat resistance and could maintain its liquid crystal molecule orientating capacity until the temperature was raised close to 450° C.

EXAMPLE 6

A soda glass substrate was immersed in a solution prepared by diluting silicon hydroxide in an alcohol-based solvent, then taken out and heated at 500° C. to form a silicon oxide film with thickness of about 1,500 Å. Thereafter, a transparent electrode was formed on the thus treated substrate and then a polyimide orientation controlling film (hereinafter referred to as PI film) with thickness of about 1,000 Å was formed further thereon.

EXAMPLE 7

A soda glass substrate was heated to about 300° C. and then subjected to electron beam evaporation by using silicon dioxide as evaporation source under a pressure below $1 \times 10^{-5}$ Torr to form a silicon oxide film with thickness of approximately 1,000 Å. Then a transparent electrode was formed thereon, followed by the formation of a PI film with thickness of about 1,000 Å further thereon.

The PI films formed according to above-mentioned Examples 6 and 7 had so high heat resistance that they didn't lose their liquid crystal molecule orientating capacity until the temperature was raised close to 450° C.

In case the sealant 2 is made of a low-melting frit glass composition prepared by mixing 1.5 parts by weight of $SiO_2$ and 2.0 parts by weight of $Al_2O_3$ to 100 parts by weight of a base composition comprising 28% by mole of $B_2O_3$, 61% by mole of PbO, 5% by mole of ZnO, 5% by mole of CuO and 1% by mole of $Bi_2O_3$, the glass substrates 1, 1' must be heated at 400° C. for 30 minutes and then sealed. As described above, in the case of the conventional products, the liquid crystal molecular orientation is disturbed by heating at about 350° C., but when the orientation controlling films obtained according the above-mentioned examples of this invention are used, no disorber of molecular orientation is caused even when heated at as high as 450° C. Thus, according to this invention, it is possible to obtain a liquid crystal display element with amazingly high display quality by using frit glass as sealant—this has been quite impossible with respect to the prior art techniques.

Described in the following are examples where liquid crystal display elements were formed by using organic polymer adhesives as sealant.

EXAMPLE 8

A soda glass substrate was immersed in a solution prepared by diluting silicon hydroxide in an alcohol-based solvent, then taken out and heated at 500° C. to form a silicon oxide film with thickness of about 1,500 Å. Then a transparent electrode was formed on each said substrate and a PIQ orientation controlling film was further formed thereon. Thereafter, the thus treated two soda glass substrates were sealed with an epoxy adhesive and then a liquid crystal material obtained by adding an ester type liquid crystal having positive dielectric anisotropy to a base azoxy liquid crystal was encapsulated to thereby form a liquid crystal display element.

EXAMPLE 9

A soda glass substrate was heated to about 300° C. and then subjected to electron beam evaporation by using silicon dioxide as evaporation source under a pressure below $1 \times 10^{-5}$ Torr to form a silicon oxide film with thickness of about 1,500 Å, followed by the formation of a transparent electrode and a PIQ orientation controlling film thereon. Thereafter, the thus treated two soda glass substrates were sealed with an epoxy adhesive and then a liquid crystal material obtained by adding an ester type liquid crystal having positive dielectric anisotropy to a base azoxy liquid crystal was encapsulated to form a liquid crystal display element.

EXAMPLE 10

A soda glass substrate was immersed in a solution prepared by diluting silicon hydroxide in an alcohol-based solvent, then taken out and heated at 500° C. to form a silicon oxide film with thickness of about 800 Å. This was followed by the formation thereon of a transparent electrode and a PI orientation controlling film with thickness of about 800 Å further thereon. Thereafter, the thus treated two soda glass substrates were sealed with an epoxy adhesive and then a liquid crystal material obtained by adding an ester type liquid crystal having positive dielectric anisotropy to a base azoxy liquid crystal to form a liquid crystal display element.

EXAMPLE 11

A soda glass substrate was heated to about 300° C. and then subjected to electron beam evaporation by using silicon dioxide as evaporation source under a pressure below $1 \times 10^{-5}$ Torr to form a silicon oxide film with thickness of approximately 1,300 Å. Then, a transparent electrode was formed on each said substrate, followed by the formation thereon of a PI orientation controlling film with thickness of approximately 400 Å. Thereafter, the thus treated two soda glass substrates were sealed with an epoxy adhesive and then a liquid crystal material obtained by adding an ester type liquid crystal having positive dielectric anisotropy to a base azoxy liquid crystal to form a liquid crystal display element.

When the liquid crystal display elements obtained according to above-mentioned Examples 8 to 11 were subjected to a moistening test under the conditions of 70° C. and relative humidity of 95%, no exudation occured for more than 300 hours. This corresponds to a life of more than 5 years under the usual circumferential conditions. In view of the fact that the life expectancy of the conventional products was less than one year as afore-mentioned, it will be noted that surprising prolongation of life is realized by this invention, and hence the liquid crystal display elements according to this invention can be applied to small table-type electronic computers, electronic time-pieces, etc., with no practical problem on life.

As understood from the foregoing explanation, the liquid crystal display element according to this invention is greatly improved in heat resistance of the orientation controlling films and can be also sealed with frit glass since the undercoating film is first formed on each glass substrate and then the transparent electrodes and the orientation controlling film are formed thereon. Also, because of improved adhesiveness of said film to the glass substrate, a life under the moistened conditions is improved when an organic adhesive is used as sealant. Further, since the undercoating film is formed between each glass substrate and the associated transparent electrodes, there occurs no voltage drop and also rising voltage-brightness property and response property are not impaired. It is therefore possible with this invention to obtain a liquid crystal display element with excellent electro-optical characteristics.

What is claimed is:

1. In a liquid crystal display element having a twisted structure comprising two spaced transparent substrates having transparent electrodes arranged thereon in desired display patterns, and a liquid crystal being sealed between the inner surfaces of said two substrates by a sealant, the improvement which comprises an undercoating film of one or more metal oxides arranged on the inner surface of each of said substrates, said transparent electrodes being separated from the inner surface of each of said substrates and being arranged on the undercoating film and an orientation controlling film made of an organic polymer and provided with abrasion grooves in a given direction, said orientation controlling film being arranged on the transparent electrodes and on the undercoating film whereby the inner surface of each of said undercoating films is separated from said liquid crystal.

2. A liquid crystal display element according to claim 1, wherein the metal oxide forming the undercoating film is silicon oxide, aluminum oxide, titanium oxide or a mixture thereof.

3. A liquid crystal display element according to claim 1, wherein the organic polymer forming the orientation controlling film has at least one member selected from the group consisting of imide ring and quinazoline ring.

4. A liquid crystal display element according to claim 1, wherein the sealant is frit glass.

5. A liquid crystal display element according to claim 1, wherein the sealant is an organic adhesive.

6. A liquid crystal display element according to claim 1, wherein the undercoating layer has a thickness of 10 Å to 100 μm.

7. A liquid crystal display element according to claim 1, wherein the transparent substrate is glass.

8. In a liquid crystal display element having a twisted structure comprising a liquid crystal and two transparent substrates with transparent electrodes arranged in a pattern thereon, and a liquid crystal being hermetically sealed between said substrates by a sealant arranged along the peripheral portions of the substrates, the improvement which comprises an undercoating film of at least one metal oxide arranged on the surface of each substrate between each substrate and the transparent electrodes, and an orientation controlling film made of an organic polymer having abrasion grooves in a given direction positioned over said electrodes and said undercoating film on each of said substrates, an inner surface of each orientation controlling film contacting said liquid crystal.

9. A liquid crystal display element according to claim 1, wherein said organic polymer is a polyimide, a polyamideimide or a polyesterimide.

10. A liquid crystal display element according to claim 1, wherein the orientation controlling film is a polyimide-isoindoloquinazolinedione film.

* * * * *